United States Patent
Chueh et al.

(10) Patent No.: US 8,555,094 B2
(45) Date of Patent: Oct. 8, 2013

(54) SYSTEM AND METHOD FOR MANAGING POWER CONSUMPTION OF AN INFORMATION HANDLING SYSTEM BASED ON THE INFORMATION HANDLING SYSTEM POWER STATE AND BATTERY STATUS

(75) Inventors: Yung Fa Chueh, Hsichin (TW); Wen-Hung Huang, Taipei (TW); Ching Ti, Taipei (TW); So-Yu Weng, Sijhih (TW)

(73) Assignee: Dell Products L.P., Round Rock, TX (US)

( * ) Notice: Subject to any disclaimer, the term of this patent is extended or adjusted under 35 U.S.C. 154(b) by 1065 days.

(21) Appl. No.: 12/252,414

(22) Filed: Oct. 16, 2008

(65) Prior Publication Data

US 2010/0100752 A1    Apr. 22, 2010

(51) Int. Cl.
*G06F 1/32* (2006.01)
*G06F 1/00* (2006.01)
*H02J 1/10* (2006.01)

(52) U.S. Cl.
USPC .............................. 713/320; 713/300; 307/43

(58) Field of Classification Search
USPC .................. 713/300, 320; 315/276; 320/125; 307/43
See application file for complete search history.

(56) References Cited

U.S. PATENT DOCUMENTS

| | | | |
|---|---|---|---|
| 5,684,382 A | 11/1997 | Fritz et al. | |
| 5,811,895 A * | 9/1998 | Suzuki et al. | 307/125 |
| 5,847,543 A * | 12/1998 | Carroll | 320/125 |
| 5,886,424 A | 3/1999 | Kim | |
| 6,272,642 B2 * | 8/2001 | Pole et al. | 713/300 |
| 6,571,343 B1 * | 5/2003 | Johnson et al. | 713/340 |
| 6,741,066 B1 | 5/2004 | Densham et al. | |
| 6,828,760 B2 | 12/2004 | Massey et al. | |
| 6,879,497 B2 | 4/2005 | Hua et al. | |
| 6,950,950 B2 | 9/2005 | Sawyers et al. | |
| 7,363,522 B2 | 4/2008 | Prosperi | |
| 7,366,924 B2 | 4/2008 | Hupman et al. | |
| 7,392,410 B2 | 6/2008 | Allen et al. | |
| 7,581,130 B2 | 8/2009 | Carroll et al. | |
| 7,646,168 B2 | 1/2010 | Tseng et al. | |
| 7,911,817 B2 | 3/2011 | Kasprzak et al. | |
| 2003/0126474 A1 | 7/2003 | Sawyers et al. | |
| 2005/0225304 A1 * | 10/2005 | Vieira Formenti et al. | 323/211 |
| 2005/0270812 A1 * | 12/2005 | Vinciarelli | 363/65 |
| 2006/0085658 A1 | 4/2006 | Allen et al. | |
| 2007/0016806 A1 | 1/2007 | Prosperi | |
| 2007/0019347 A1 * | 1/2007 | Tseng et al. | 361/90 |
| 2007/0096692 A1 | 5/2007 | Chuang et al. | |
| 2007/0117533 A1 * | 5/2007 | Han et al. | 455/343.1 |
| 2007/0229024 A1 * | 10/2007 | Li et al. | 320/111 |
| 2008/0232209 A1 * | 9/2008 | Vergoossen et al. | 369/47.5 |

(Continued)

*Primary Examiner* — Thomas Lee
*Assistant Examiner* — Terrell Johnson
(74) *Attorney, Agent, or Firm* — Terrile, Cannatti, Chambers & Holland, LLP; Robert W. Holland

(57) ABSTRACT

An AC-to-DC power adapter provides DC power to an information handling system at a first higher DC voltage or a second lower DC voltage based upon a power state of the information handling system. For example, approximately 19 Volts DC power is provided if the information handling system is in an on state or if the information handling system is charging a battery. Approximately 13 Volts DC power is provided if the information handling system is in a reduced power state, such as an ACPI S3 state, with a battery having a substantially full charge.

19 Claims, 4 Drawing Sheets

(56) References Cited

U.S. PATENT DOCUMENTS

| | | | |
|---|---|---|---|
| 2008/0246438 A1* | 10/2008 | Lu | 320/137 |
| 2009/0009153 A1* | 1/2009 | Wong et al. | 323/318 |
| 2009/0224603 A1* | 9/2009 | Perper et al. | 307/43 |
| 2010/0067268 A1 | 3/2010 | Kasprzak et al. | |
| 2010/0100752 A1 | 4/2010 | Chueh et al. | |
| 2010/0185877 A1 | 7/2010 | Chueh et al. | |

* cited by examiner

SYSTEM AND METHOD FOR MANAGING POWER CONSUMPTION OF AN INFORMATION HANDLING SYSTEM BASED ON THE INFORMATION HANDLING SYSTEM POWER STATE AND BATTERY STATUS

BACKGROUND OF THE INVENTION

1. Field of the Invention

The present invention relates in general to the field of information handling system power subsystems, and more particularly to a system and method for managing power consumption of an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling system components have improved performance over the past several years, power consumed by components within information handling systems has also tended to increase. Increased power consumption by components has led to a number of improvements that reduce overall power consumption by information handling systems. For example, information handling system manufacturers have adopted an ACPI standard having reduced power states to help reduce information handling system power consumption when an information handling system is not actively in use. The reduced power states are designated as S0 through S5, with S0 representing a fully on state and S5 representing a fully off state. Intermediate reduced power states S1 through S4 have at least some components of the information handling system powered down to reduce power consumption. For example, the S3 state suspends operating information in RAM and powers down other components. The S4 state suspends operating information to permanent storage, such as a hard disk drive, and powers down all components.

In particular, power consumption presents a concern for portable information handling systems because portable systems sometimes run on an internal battery having a limited charge life. Portable information handling systems typically use an external AC-to-DC power adapter that converts AC power provided from an external power source into DC power for use by the portable information handling system. Desktop information handling systems also use an AC-to-DC converter to convert external AC power into DC power for use by internal components, however, the AC-to-DC converter is generally incorporated into the housing of the information handling system. Usually, the AC-to-DC converter provides a set voltage, such as approximately 19 Volts DC, at a power connector located at the housing of the information handling system and then an internal power subsystem applies the set voltage at different levels of Voltage to a number of different power rails for powering different components. Energy Star standards specify low power consumption levels for information handling systems in reduced power states and the off state so that the power consumed by an external AC-to-DC adapter must remain minimal in the reduced power and off states in order to meet the Energy Star standards. These reduced power consumption levels have become more difficult to meet as the amount of power required from AC-to-DC adapters has increased. One solution to reduce power consumption is to add a load switch to reduce leakage current, however, this solution complicates power subsystem design, especially where power subsystem DC-to-DC converters have to provide DC power levels with and without engagement of the load switch.

SUMMARY OF THE INVENTION

Therefore a need has arisen for a system and method which reduces power consumption of an information handling system during reduced power states.

In accordance with the present invention, a system and method are provided which substantially reduce the disadvantages and problems associated with previous methods and systems for managing power consumption of an information handling system during reduced power states. An AC-to-DC adapter that outputs a first DC voltage level to power an information handling system outputs a second reduced voltage level when the information handling system enters a reduced power state.

More specifically, an information handling system has plural processing components that cooperate to process information. An AC-to-DC adapter provides the information handling system with a first voltage that powers the processing components when the information handling system is in an on state, such as the ACPI S0 state. If the information handling system enters a reduced power state, such as an ACPI S3 or S5 state, a power manager running on a processing component of the information handling system signals an adapter manager running on the AC-to-DC adapter to transition from the first voltage to output a reduced voltage that consumes reduced power. In one embodiment, the information handling system power manager does not signal for a reduced voltage output if a battery on the information handling system is in a charging state. If the information handling system transitions from the reduced power state to an on state, the power manager signals the adapter manager to transition from the reduced second voltage level to the normal operating first voltage level.

The present invention provides a number of important technical advantages. One example of an important technical advantage is that power consumption is reduced during reduced power states with minimal expense and design complexity at a system level. Reduced voltage output levels during reduce power states provides increased efficiency for AC-to-DC power conversion so that power consumption is reduced. Reducing voltage output levels from an adapter in reduced power states has minimal impact on operations within an information handling system since most of the components of the information handling system are powered down. Voltage output by the AC-to-DC power adapter is increased when the information handling system transitions from the reduced power state to an operating state so that components within the information handling system do not have to adjust to different voltage levels. Reducing voltage during reduced power states helps to meet energy efficiency standards, such as Energy Star 4.0 standards that restrict energy consumption in the sleep mode to less than 2.4 Watts and in the off mode to less than 1 Watt. In one embodiment, energy consumption is reduced by as much as 50% by using the reduced voltage output from the AC-to-DC adapter.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Selectively providing a first higher DC voltage or a second lower DC voltage from an AC-to-DC adapter to an information handling system reduces overall power consumption. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
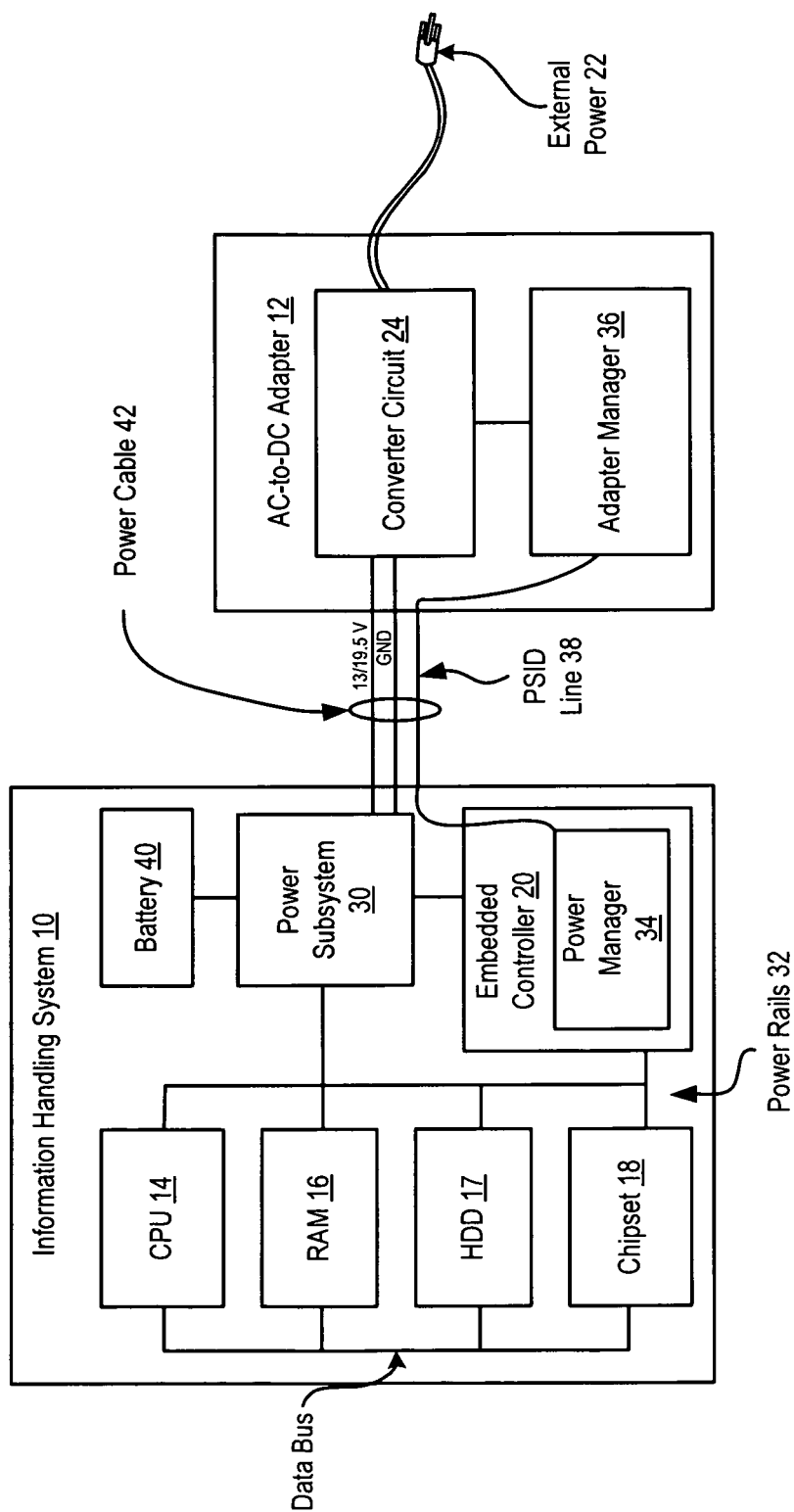
FIG. 1 depicts a block diagram of an information handling system having an AC-to-DC adapter that outputs multiple DC voltage levels.

Referring now to FIG. 1, a block diagram depicts an information handling system 10 having an AC-to-DC adapter 12 that outputs multiple DC voltage levels. Information handling system 10 has plural processing components, such as a CPU 14, RAM 16, a hard disk drive 18, a chipset 20 and an embedded controller 22, that cooperate to process information. AC-to-DC adapter 12 accepts AC power from an external AC power source 22 at a converter circuit 24 to convert the AC voltage into first higher DC voltage 26 and a second lower DC voltage 28. For example, the first higher DC voltage is approximately 19.5 Volts, meaning within a range of 18 to 21 Volts, and the second lower DC voltage is approximately 13 Volts, meaning within a range of 11 to 14 Volts. Information handling system 10 has a power subsystem 30 which accepts DC power from AC-to-DC adapter 12 and provides the power to the processing components through one or more power rails 32 at voltage levels set for each processing component.

A power manager 34 running on embedded controller 20 interfaces with AC-to-DC adapter 12 through a power cable 42 and power subsystem 30 to manage selection of the higher or lower DC voltage output. Power manager 34 communicates with an adapter manager 36 through a PSID line 38 of cable 42 to exchange identification information that ensures the compatibility of AC-to-DC adapter 12 with information handling system 10. During normal operations, such as in the ACPI S0 on state, power manager 34 commands adapter manager 36 to output 19.5 Volts through first higher DC voltage line 26 and power cable 42. Power subsystem 30 applies power provided from AC-to-DC adapter 12 to operate the processing components through one or more power rails 32 and applies any excess power to charge an internal battery 40. If information handling system 10 enters a reduced power state, such as the ACPI S3 "suspend to RAM" state or S5 off state, then power manager 34 determines if battery 40 is charging or fully charged. If battery 40 is in a charging state, power manager 34 continues to command output from the first higher DC voltage 26 through cable 42. If battery 40 is fully charged, meaning no longer charging, then power manager 34 commands adapter manager 36 to output the second lower DC voltage 28 through power cable 42. While information handling system 10 is in the reduced power state and battery 40 is not charging, the second lower DC voltage of approximately 13 Volts is output from converter circuit 24. If information handling system 10 enters the on state or battery 40 needs charging, power manager 34 commands adapter manager 36 to output first higher DC voltage 26.

Figure 2:
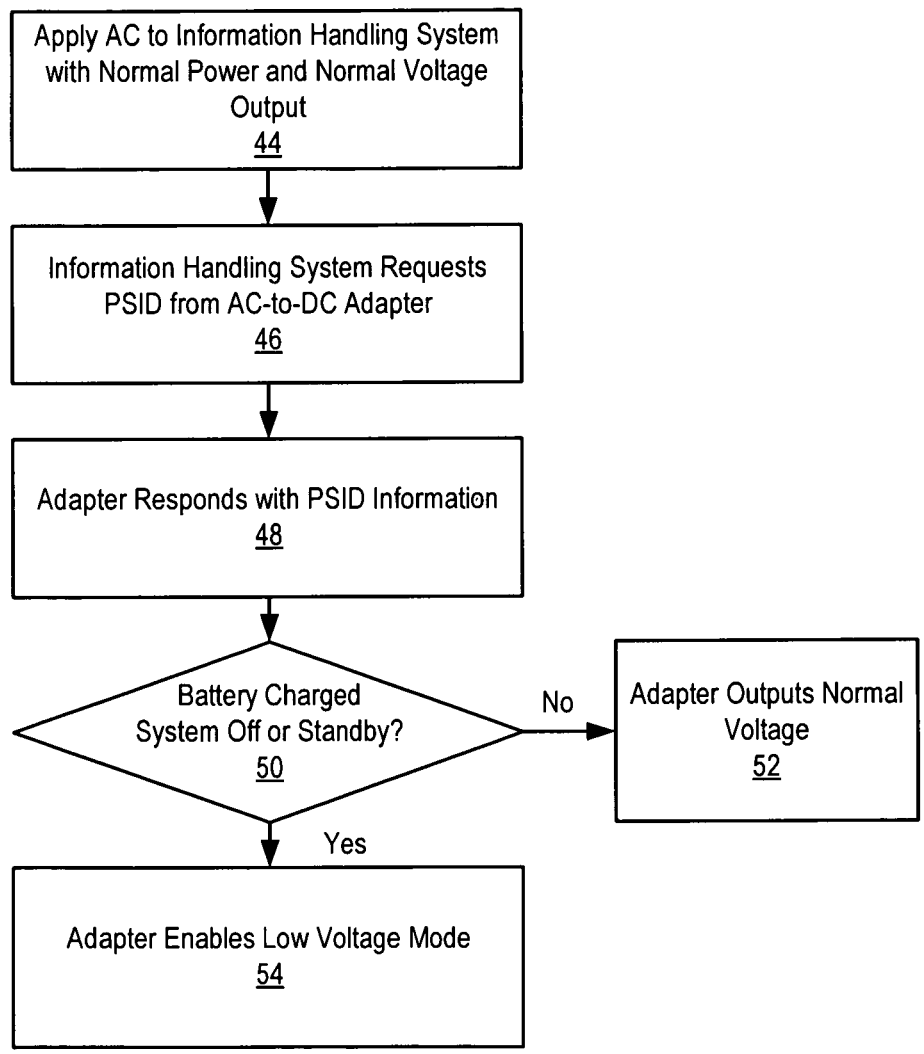
FIG. 2 depicts a flowchart of a process for providing a selected of plural DC voltage levels from an AC-to-DC adapter to an information handling system.

Referring now to FIG. 2, a flowchart depicts a process for providing a selected of plural DC voltage levels from an AC-to-DC adapter to an information handling system. The process starts at step 44 with insertion of an external AC-to-DC adapter cable at the housing of the information handling system with the initial power and voltage at normal levels. At step 46, the information handling system requests a power system identification PSID from the external adapter. At step 48, the adapter responds with a PSID code that identifies the type of adapter for the information handling system. At step 50, a determination is made of whether the information handling system is in a reduced power state, such as an S5 off state or an S3 suspend to RAM state, and whether the battery has a full charge or is charging. If the system is not in a reduced power state or the battery is charging, the process continues to step 52 to continue outputting the normal voltage. If the system is in a reduced power state and the battery is not charging, the process continues to step 54 to reduce the voltage output from the adapter. Although this example embodiment involves an external AC-to-DC adapter used with a portable information handling system, alternative embodiments manage operation of an AC-to-DC adapter integrated within a housing, such as in a desktop information handling system.

Figure 3:
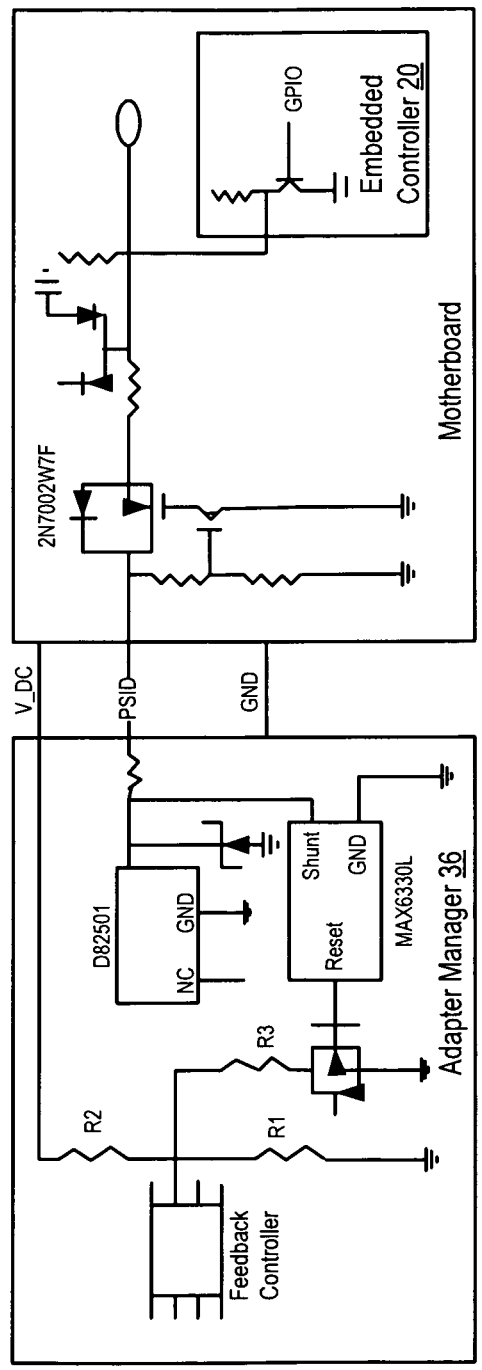
FIG. 3 depicts a circuit diagram of a system for selecting a DC voltage to apply to an information handling system.

Referring now to FIG. 3, a circuit diagram depicts a system for selecting a DC voltage to apply to an information handling system. Embedded controller 20, which also may include or be known as a keyboard controller, outputs a continuous low signal to command a reduced voltage level output from the AC-to-DC adapter, such as when power manager 34 detects a reduced power state and a no-charging state. Adapter manager 36, built with a MAX6330L integrated circuit in the example embodiment of FIG. 3, changes the output DC voltage from the normal high value of approximately 19.5 Volts to the reduced value of approximately 13 Volts after a short delay of approximately 100 to 200 mseconds. If V_PSID provided from embedded controller 20 is high, then V_DC is equal to (1+R2/(R1//R3))*2.5V, so that V_DC equals 19.5V. If V_PSID provided from embedded controller 20 is low, then V_DC=(1+R2/R1)*2.5 so that V_DC is equals 13 V.

Figure 4:
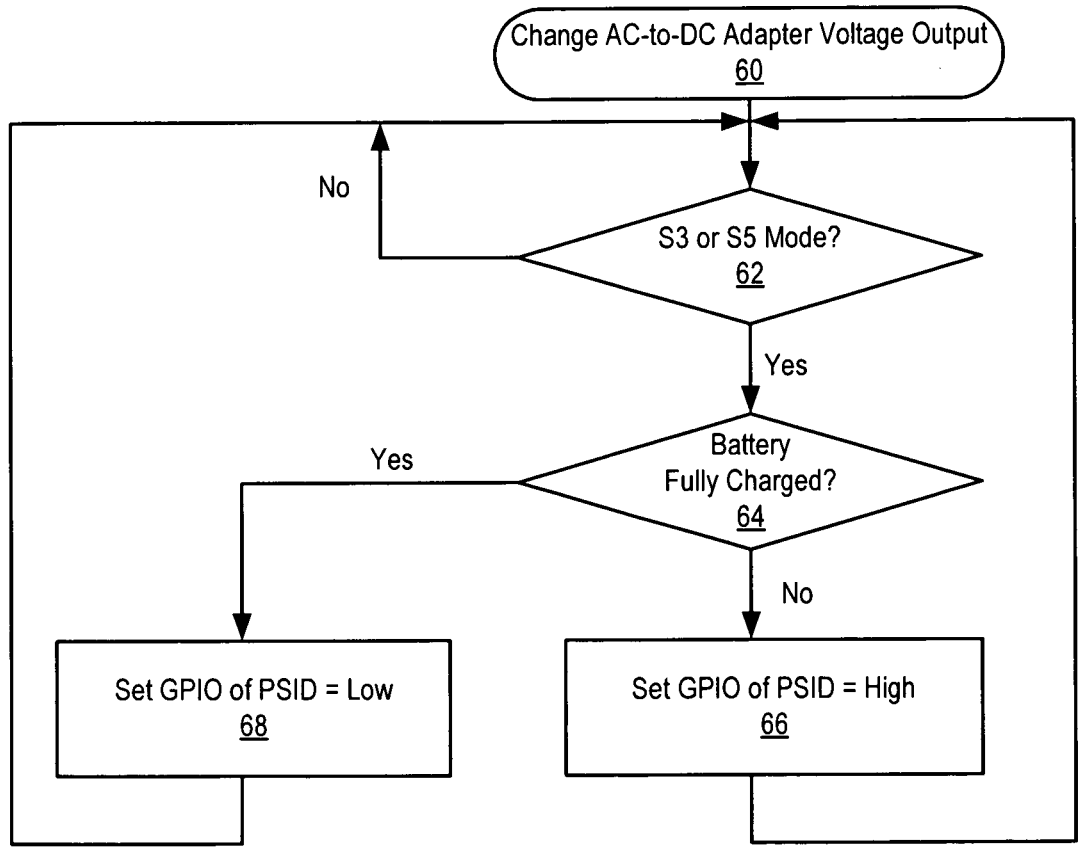
FIG. 4 depicts a flow diagram of a control process for selecting a DC voltage to apply to an information handling system.

Referring now to FIG. 4, a flow diagram depicts a control process for selecting a DC voltage to apply to an information handling system. The process begins at step 60 with a query of whether to change the AC-to-DC adapter voltage. At step 62, a determination is made of whether the information handling system is in and ACPI S3 or S5 reduced power mode. If not, the process iteratively repeats the query at step 62 until a reduced power state is detected. If a reduced power state is detected, the process continues to step 64 for a determination of the charging state of the information handling system. If the battery is not fully charged, the process continues to step 66 to set the GPIO pin of the PSID to high so that the adapter is commanded to continue providing the higher voltage level. If the battery is fully charged, the process continues to step 68 to set the GPIO pin of the PSID to low so that the adapter is commanded to provide the lower voltage level. The process iterates from step 66 or step 68 to step 62 to periodically assess the power and charge states of the information handling system. In alternative embodiments, the AC-to-DC adapter can reduce to low voltage values that support the adapter manager so that the higher voltage output for normal operations can be recalled in a desired time. In one alternative embodiment, the AC-to-DC adapter outputs zero voltage until awakened by the information handling system through the PSID line. In alternative embodiments, the AC-to-DC adapter may transition to the lower voltage output value when the information handling system is in a reduced power state and then charge the battery at the lower voltage output level.

Although the present invention has been described in detail, it should be understood that various changes, substitutions and alterations can be made hereto without departing from the spirit and scope of the invention as defined by the appended claims.

What is claimed is:

1. An information handling system comprising:
    plural components that consume power to process information, the plural components including at least a central processor unit;
    a battery that charges to store power and discharges the stored power to provide power to the plural components;
    a power subsystem operable to provide direct current voltage to the plural components;
    a power adapter operable to convert alternating current to direct current and to provide the direct current to the power subsystem;
    an adapter manager integrated with the adapter and operable to adjust the adapter direct current voltage output between a first voltage level and a second voltage level; and
    a power manager associated with the power subsystem and interfaced with the adapter manager, the power manager operable to issue a general purpose input/output (GPIO) state to command the first direct current voltage if the central processor unit has a first power consumption state in which the central processor unit consumes a first amount of power and the second direct current voltage if the central processor unit has a second power consumption state in which the central processor unit consumes a second amount of power, wherein at least some of the plural components consume power in both the first and second power consumption states.

2. The information handling system of claim 1 wherein the first direct current voltage comprises 19.5 Volts and the second direct current voltage comprises 13 Volts.

3. The information handling system of claim 1 wherein the first power consumption state comprises an on state and the second power consumption state comprises a power consumption state having at least a processing component of random access memory powered.

4. The information handling system of claim 3 wherein the second power consumption state further comprises a battery fully charged state.

5. The information handling system of claim 1 wherein the second power consumption state comprises an ACPI S3 state.

6. The information handling system of claim 5 wherein the second power consumption state further comprises a battery fully charged state.

7. The information handling system of claim 1 wherein the first power consumption state comprises a battery not fully charged state and the first direct current voltage is greater than the second direct current voltage.

8. The information handling system of claim 1 further comprising a housing that contains the plural components, wherein the power adapter is integrated within the housing.

9. The information handling system of claim 1 further comprising a housing that contains the plural components, wherein the power adapter is external to the housing.

10. A method for managing power applied to an information handling system, the method comprising:
    determining at the information handling system a first power state or a second power state, the first state having a central processor unit powered on, the second state having the central processor unit powered off, a battery fully charged and a memory powered on;
    commanding with a GPIO state of the information handling system an AC-to-DC adapter to provide a first direct current voltage if the first power state is determined or a second direct current voltage if the second power state is determined, the first direct current voltage greater than the second direct current voltage; and
    outputting either the first or second direct current voltage from the AC-to-DC adapter in response to the commanding.

11. The method of claim 10 wherein the first direct current voltage comprises 19.5 Volts and the second direct current voltage comprises 13 Volts.

12. The method of claim 10 wherein the first power state comprises an ACPI on state and the second power state comprises an ACPI reduced power state, and wherein the first direct current voltage is greater than the second direct current voltage.

13. The method of claim 12 wherein the on state comprises an ACPI S0 state and the reduced power state comprises an ACPI S3 state.

14. The method of claim 10 wherein the first power state further comprises a battery charging state and the second power state comprises a battery charged state.

15. An AC-to-DC power adapter comprising:
    a converter circuit operable to convert an AC voltage to either a first or a second DC voltage and to provide the first or the second DC voltage to a device, the first DC voltage greater than the second DC voltage; and
    an adapter manager operable to receive power state information from the device, the power information generated within the device as a GPIO state, and to apply the power state information to select output of either the first or second DC voltage, the power state information including at least whether a central processor unit of the device is powered on or powered off and whether a battery of the device is charged or charging;

wherein the adapter manager applies the first DC voltage if the battery is charging and the second DC voltage if the battery is charged and the processor is powered off.

16. The AC-to-DC power adapter of claim 15 wherein the first DC voltage comprises 19.5 Volts and the second DC voltage comprises 13 Volts.

17. The AC-to-DC power adapter of claim 15 wherein the power state information further comprises a reduced power state having the processor of the device powered off and a memory of the device powered on with the battery charged, the adapter manager selecting the first DC voltage for the on state and the second DC voltage for the reduced power state.

18. The AC-to-DC power adapter of claim 17 further comprising a second reduced power state having the processor powered off, the memory powered on and the battery charging at the device, the adapter manager selecting first DC voltage for the second reduced power state.

19. The AC-to-DC power adapter of claim 18 wherein the on state comprises an ACPI S0 state and the second reduced power state comprises an ACPI S3 state.

* * * * *